(No Model.)

J. C. W. WILSON.
REAMER.

No. 303,410.　　　　　　Patented Aug. 12, 1884.

Witnesses,
Geo. H. Strong.

Inventor
J. C. W. Wilson
By Dewey & Co.
Attorneys

UNITED STATES PATENT OFFICE.

JOHN C. W. WILSON, OF EAST PORTLAND, OREGON.

REAMER.

SPECIFICATION forming part of Letters Patent No. 303,410, dated August 12, 1884.

Application filed September 29, 1883. (No model.)

*To all whom it may concern:*

Be it known that I, JOHN C. W. WILSON, of East Portland, county of Multnomah, and State of Oregon, have invented an Improvement in a Reamer or Boring - Tool; and I hereby declare the following to be a full, clear, and exact description thereof.

My invention relates to a new and useful reamer or boring-tool for turning work and for boring; and it consists in a stock having a conical point, a tubular casting or hollow nut threaded upon the end of said stock, and having independent radiating studs loosely seated in it and projecting outwardly. The conical point of the stock enters between the inner ends of the studs within the hollow nut as said nut is set up, and forces them outwardly to bind upon and fix the ring or other work to be turned. By seating cutters in said ring the mandrel is used for boring.

The object of my invention is to provide a simple and effective reamer or boring-tool.

Figure 1:
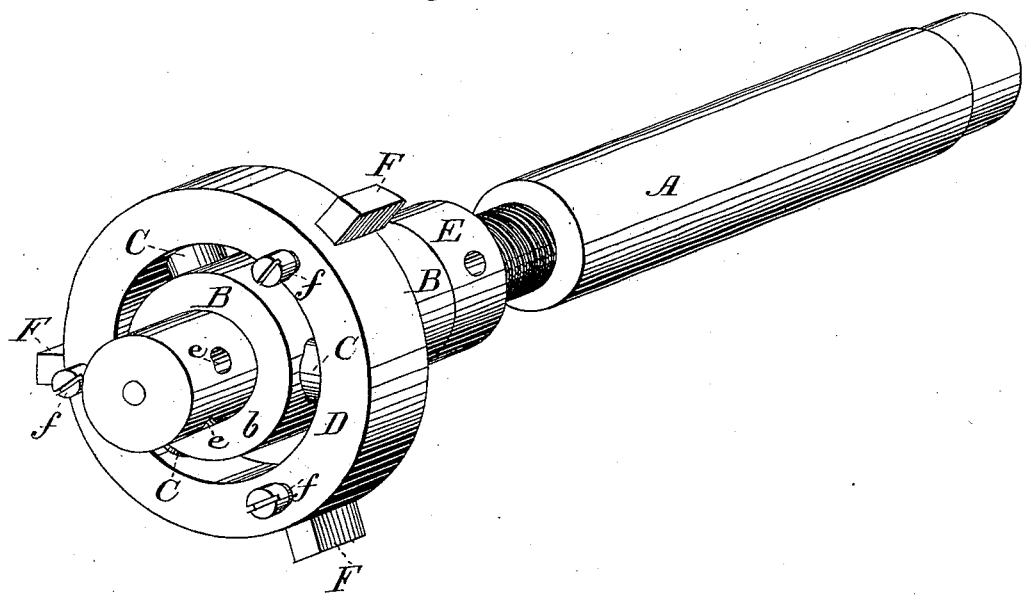
Figure 2:
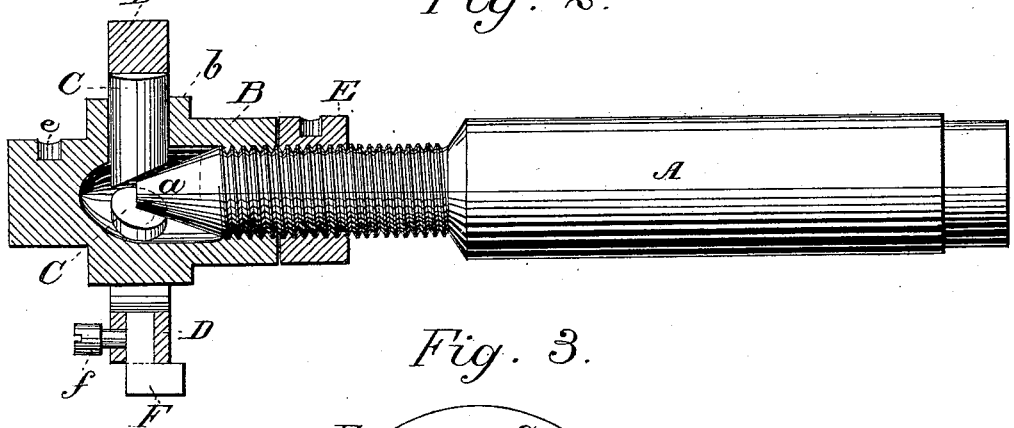
Figure 3:
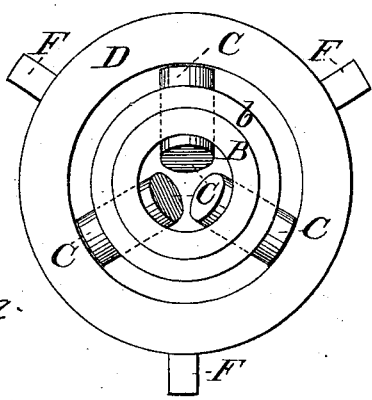

Referring to the accompanying drawings, Figure 1 is a perspective view of my improved tool. Fig. 2 is a vertical section through the hollow nut, jam-nut, and ring D, and an elevation of the bar A. Fig. 3 is an elevation looking at the hollow portion of nut B, showing the studs C, the bar A being left out.

A is a bar forming the stock of the tool. Its end is threaded, and it has a conical point, *a*.

B is a tubular casting or hollow nut internally threaded at one end and closed at the other. Its outer surface is provided with an offset portion, *b*. Through this portion are loosely-fitted independent studs C, the outer ends of which project, and their inner ends extend within the nut, and are slightly beveled, as shown, for the better entrance of the point *a* of the stock. There are three of these studs, their inner ends meeting within the nut, but leaving an entrance socket or space for the conical point *a* of stock A. When the nut B is screwed upon the stock, the entrance of the conical point forces outwardly or expands the studs C, so that the ring D, which at first is loosely fitted over the studs, is firmly bound thereon. The nut B is provided at one end with holes *e* for setting it up, while a jam-nut, E, is fitted upon the stock for fixing the hollow nut in place. When relieved of the conical point of the stock, the ring or other work to be turned may be readily removed, as the studs are easily forced in.

This tool may be used for boring as well as turning work simply by making the ring, which heretofore I have considered as the object or result of the mandrel when used for turning, a part of the tool, and making it the seat for the cutters. For this purpose I have made holes in its rim, in which I have fitted cutters F, set by screws *f*. By loosening these screws the cutters may be expanded and again set. The ring will be tightly held by the studs, as before, and may be removed readily when desired.

Having thus described my invention, what I claim as new, and desire to secure by Letters Patent, is—

A reamer or boring-tool consisting of the bar or stock A, having a conical point, *a*, the tubular casting or hollow nut B, threaded upon the end of the stock, the independent radiating studs C, seated loosely in said nut, the ring or band D, fixed by said studs, and the adjustable cutters F, seated in said ring, substantially as herein described.

In witness whereof I have hereunto set my hand.

JOHN C. W. WILSON.

Witnesses:
DENNIS McCARTHY,
CHAS. WAR.